United States Patent
Stone et al.

(10) Patent No.: US 6,718,614 B2
(45) Date of Patent: Apr. 13, 2004

(54) VACUUM CUP WITH PRECISION HARD STOP

(75) Inventors: Paul R. Stone, Federal Way, WA (US); David E. Strand, Newcastle, WA (US); Paul E. Nelson, University Place, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/338,568

(22) Filed: Jan. 7, 2003

(65) Prior Publication Data

US 2003/0094552 A1 May 22, 2003

Related U.S. Application Data

(62) Division of application No. 09/669,322, filed on Sep. 25, 2000, now Pat. No. 6,502,808.
(60) Provisional application No. 60/157,141, filed on Sep. 30, 1999.

(51) Int. Cl.$^7$ ................................................ B23Q 7/00
(52) U.S. Cl. ...................................................... 29/559
(58) Field of Search ............................... 269/21, 71, 75, 269/76; 279/3; 294/64.1, 65; 451/388; 248/262, 263; 29/259

(56) References Cited

U.S. PATENT DOCUMENTS

| 4,491,306 A | * | 1/1985 | Eickhorst | 269/21 |
| 5,139,245 A | * | 8/1992 | Bruns et al. | 269/21 |

* cited by examiner

*Primary Examiner*—Robert C. Watson
(74) *Attorney, Agent, or Firm*—J. Michael Neary

(57) ABSTRACT

A method and apparatus for holding a part on a fixture in a precisely known predetermined position includes pressing a surface of the part against a vacuum head and sealing an annular elastomeric sealing ring against the part surface. A valve button of a valve is engaged by the part surface to open the valve and establish communication between a vacuum source. The part is pulled by the vacuum against a hard stop in the vacuum head having a fixed precisely known relationship to said vacuum head reference surface. The hard-stop can be mounted in the base of the vacuum head for pivoting about at least one axis to self-align the hard-stop face with the part face.

4 Claims, 6 Drawing Sheets

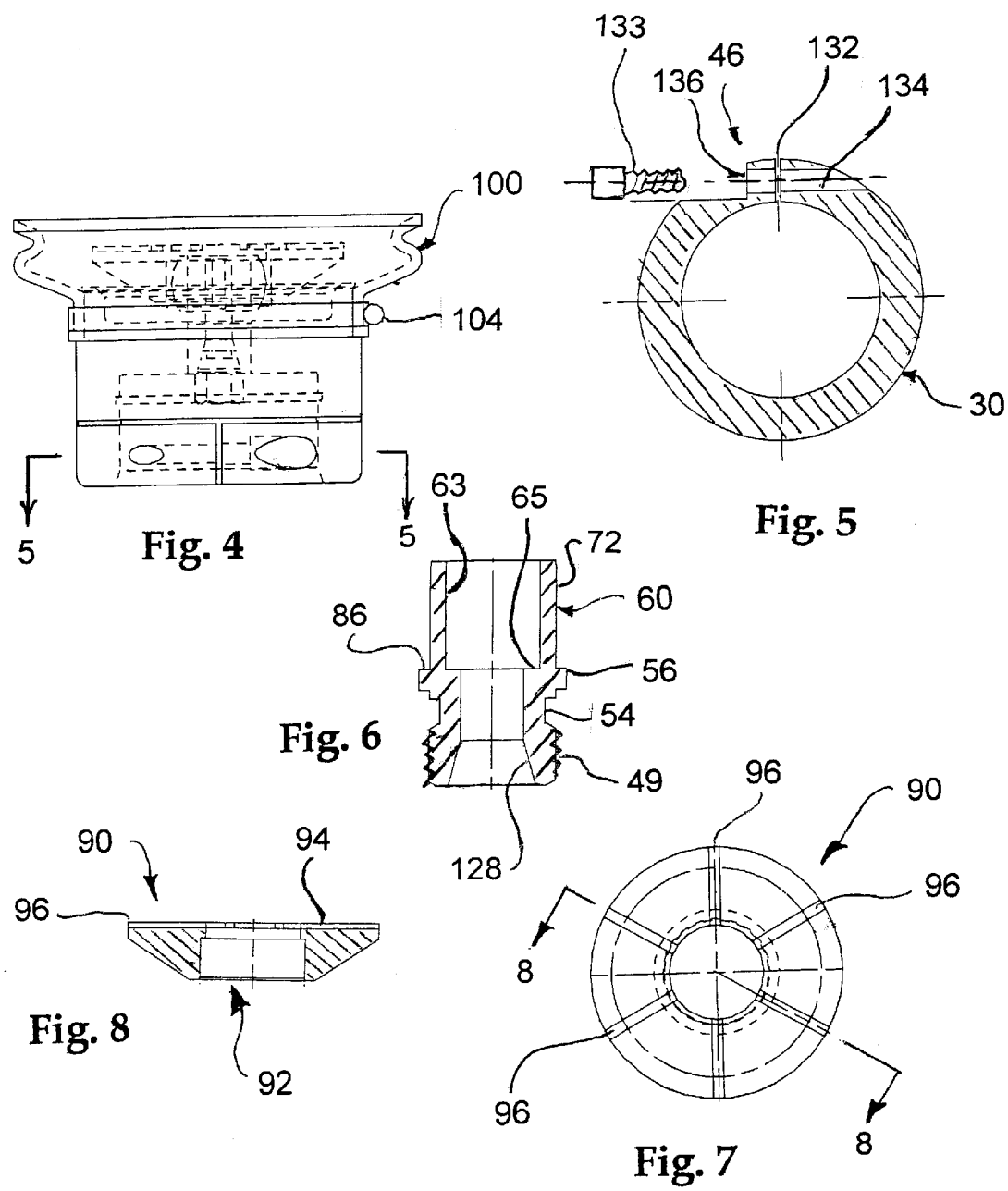

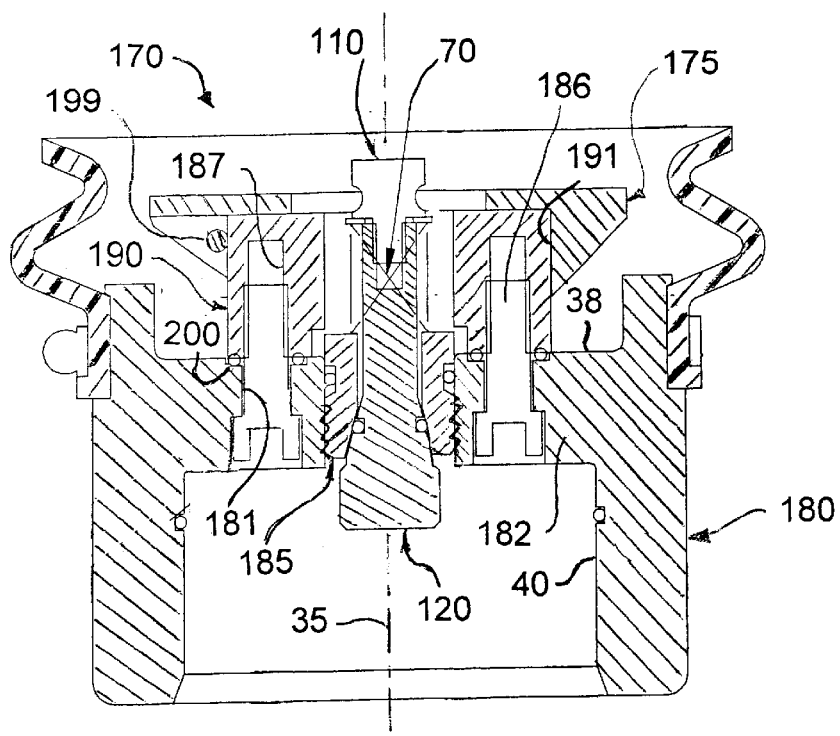
Fig. 13
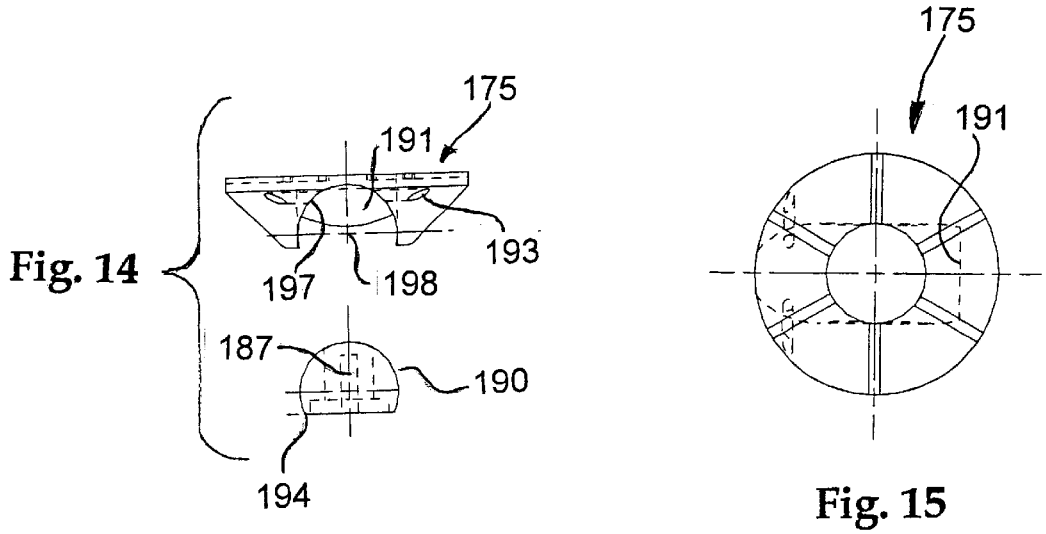
Fig. 14
Fig. 15

VACUUM CUP WITH PRECISION HARD STOP

This application is a division of application Ser. No. 09/669,332 filed Sep. 25, 2000, now U.S. Pat. No. 6,502,808 issued Jan. 7, 2003 which claims the benefit of Provisional application No. 60/157,141 filed Sep. 30, 1999.

TECHNICAL FIELD

This invention relates to a method and apparatus for securing parts, such as webs for wing spars and ribs, to a holding apparatus for machining and/or assembly into a larger part, such as wing spars and ribs, and more particularly to a vacuum head and method for holding a part in a fixed and precisely known position for machining and/or drilling to close tolerances.

BACKGROUND OF THE INVENTION

Conventional manufacturing techniques for machining and assembling large mechanical assemblies such as airplane wing spars and ribs to a specified contour have, in the past, relied on fixtured "hardpoint" tooling techniques utilizing floor assembly jigs and templates to locate and temporarily fasten detailed structural parts together to position the parts correctly relative to one another. This traditional tooling concept usually requires primary assembly tools for each subassembly produced, and large assembly tools in which the subassemblies are assembled into the assembled structure.

Assembly tooling is intended to accurately reflect the original engineering design of the product, but using the conventional tooling concept in which the tooling sets the configuration of the final assembly, there are many steps between the original design of the product and the final manufacture of the tool. It is not unusual that the tool as finally manufactured produces missized spars or wing components that would be outside of the dimensional tolerances of the original spar or spar component design without extensive, time consuming and costly hand work to correct the tooling-induced errors. More seriously, a tool that was originally built within tolerance can become out of tolerance from the hard use it typically receives in the factory. Moreover, dimensional variations caused by temperature changes in the factory can produce a variation in the final part dimensions as produced on the tool, particularly when a large difference in the coefficient of thermal expansion exists between the tooling and the spar, as in the usual case where the tooling is made of steel and the spar components are made of aluminum. Since dimensions in airplane construction are often controlled to within 0.005", temperature induced dimensional variations can be significant.

Hand drilling of the part on the tool can produce holes that are not perfectly round or normal to the part surface when the drill is presented to the part at an angle that is slightly nonperpendicular to the part, and also when the drill is plunged into the part with a motion that is not perfectly linear. Parts can shift out of their intended position when they are fastened in non-round holes, and the nonuniform hole-to-fastener interference in a non-round hole lacks the strength and fatigue durability of round holes. The tolerance buildup on the spar subassemblies can result in significant growth from the original design dimensions, particularly when the part is located on the tool at one end of the part, forcing all of the part variation in one direction instead of centering it over the true intended position.

One effective solution to the hard tooling problem is shown in U.S. patent application Ser. No. 09/155,236 entitled "Determinant Spar Assembly" by Clayton Munk, Paul Nelson and David Strand. The process and apparatus of that invention eliminates hard tool and uses instead a fixture that holds the part in a position that can be probed to determine its actual location in space without reference to the fixture itself. However, it is still desirable to mount the part on the fixture in a position and orientation that is as close to a known and flat shape as possible, and to do so quickly and inexpensively. The use of a vacuum head on the settable pogos of the holding apparatus solves the requirement.

SUMMARY OF THE INVENTION

Accordingly, this invention makes it possible to hold parts in precisely known positions for machining and assembly operations. It provides vacuum to a vacuum head only if a part or other tool is presented to the vacuum head to avoid compromising the vacuum source by open vacuum heads, and eliminates the need to manually turn off or seal vacuum heads that are not used to hold a particular part on the holding apparatus.

The benefits of the invention are attained in a method and apparatus for holding a part on a fixture in a precisely known predetermined position. It includes pressing a surface of the part against a vacuum head and sealing an annular elastomeric sealing lip of a vacuum cup against the part surface. A valve button of a valve is engaged by the part surface to open the valve and establish communication between a vacuum source. The part is pulled by the vacuum against a hard stop in the vacuum head having a fixed precisely known relationship to said vacuum head reference surface. The hard-stop can be mounted in the base of the vacuum head for pivoting about at least one axis to self-align the hard-stop face with the part face.

DESCRIPTION OF THE DRAWINGS

The invention and its many attendant objects and advantages will become better understood upon reading the following detailed description of the preferred embodiment in conjunction with the following drawings, wherein:

FIG. 4 is a side elevation of the vacuum head shown in FIG. 1, showing the base clamp for securing the vacuum head base to a support arm;

FIG. 5 is a sectional plan view of the vacuum head base along lines 5—5 in FIG. 4;

FIG. 6 is a sectional elevation of the valve body shown in FIGS. 2 and 3;

FIG. 7 is a top plan view of the hard-stop shown in FIGS. 1–3;

FIG. 8 is a sectional elevation of the hard-stop along lines 8—8 in FIG. 7;

FIG. 13 is a sectional elevation of a third embodiment of the inventive vacuum head having a hard-stop that swivels about a lateral axis;

FIG. 14 is an exploded elevation of the swiveling hard-stop shown in FIG. 13 and the cylindrical bearing on which it is mounted; and FIG. 15 is a top plan view of the hard-stop shown in FIG. 14.

DESCRIPTION OF THE PREFERRED EMBODIMENT

Figure 1:
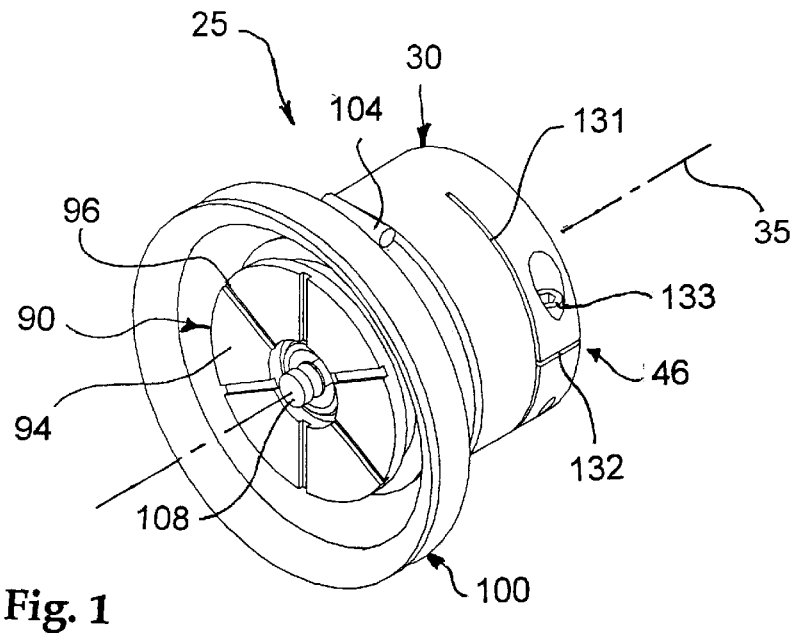
FIG. 1 is a perspective view of a vacuum head in accordance with this invention having a universal swiveling hard-stop.
Figure 2:
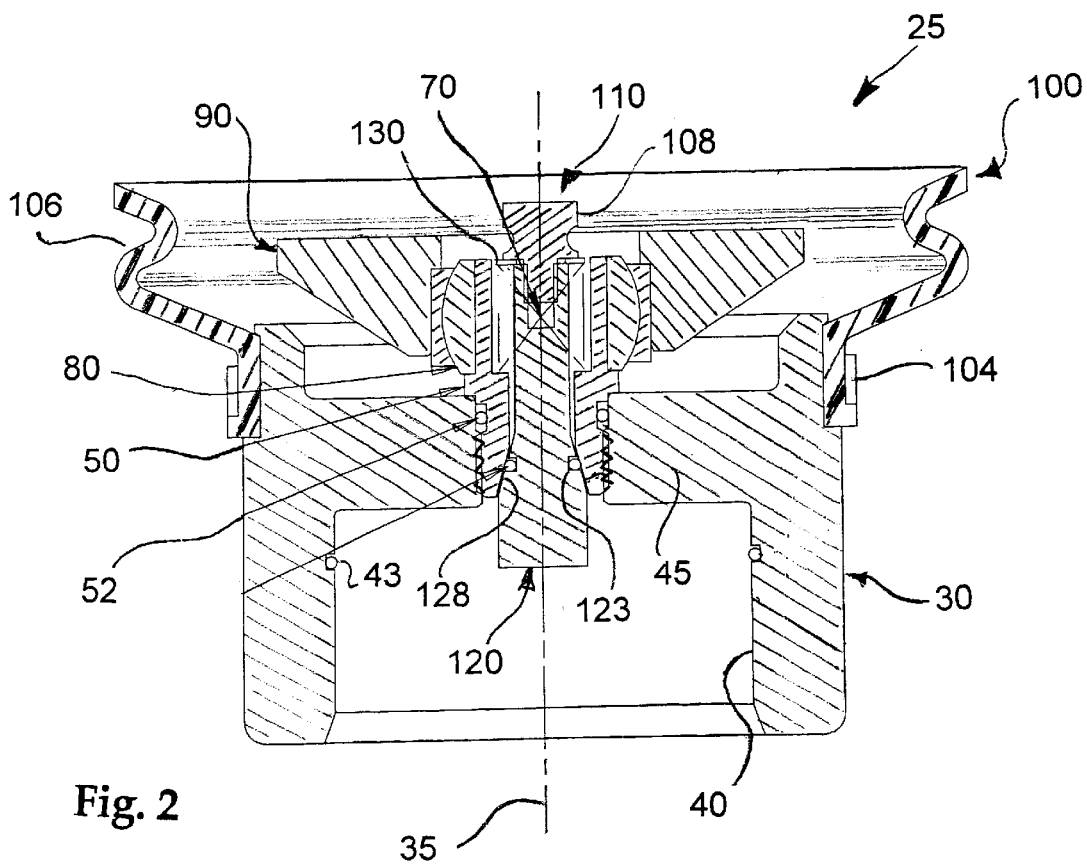
FIG. 2 is a sectional elevation of the vacuum head shown in FIG. 1 taken parallel to the central axis the view of a spar built in accordance with the process and on the apparatus of this invention.

Referring now to the drawings, wherein like reference characters designate identical or corresponding parts, and more particularly to FIGS. 1 and 2 thereof, a vacuum head 25 is shown for holding a part on a fixture for machining operations and assembly. Such a fixture and process, for example, is disclosed in U.S. patent application Ser. No. 09/155,236 entitled "Determinant Spar Assembly" by Clayton Munk, Paul Nelson and David Strand, the disclosure of which is incorporated herein by reference.

Figure 3:
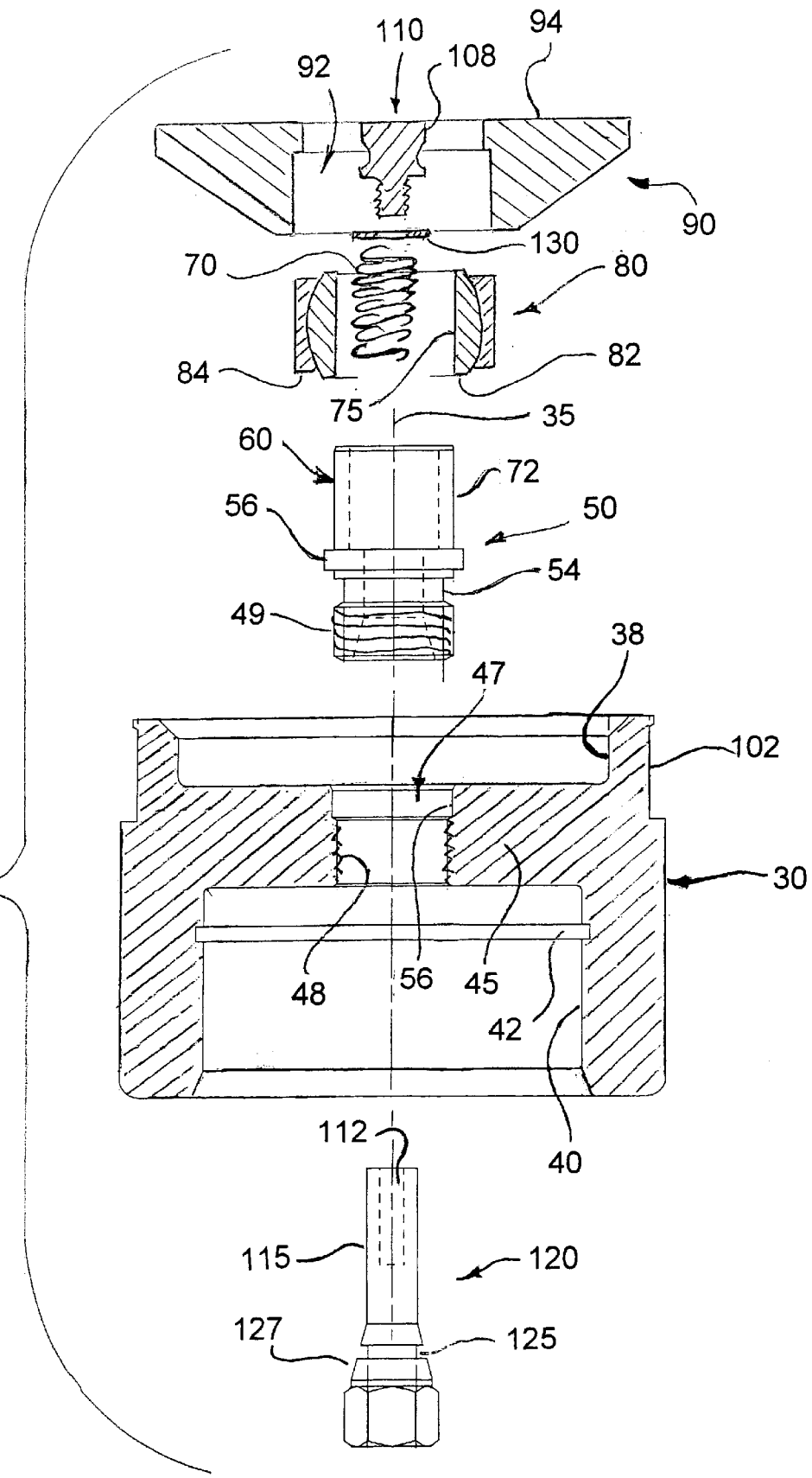
FIG. 3 is an exploded sectional elevation of the vacuum head shown in FIGS. 1 and 2.

The vacuum head 25 includes a cylindrical base 30 having a central axis 35 oriented vertically in FIGS. 2 and 3. The base 30 has an upper recess 38 and a lower recess 40 each having a flat floor 39 and 41, respectively, which define opposite sides of an intermediate web 45. The web 45 serves as a partition to isolate vacuum conveyed to the recess 40 from the recess 38 until a valve in the web 45 is opened, as explained below.

The terms "upper", "lower" and other such orientation-dependent terms are used herein to assist the reader in relating FIGS. 2 and 3 to the description of this embodiment. Naturally, the invention is not limited to any particular orientation and can be used in any desired orientation.

The recess 40 of the base 30 receives the end of a support arm of a holding apparatus and is sealed by an O-ring 43 in a groove 42 in the cylindrical wall of the recess 40. The vacuum head is secured on the support arm by a clamp structure 46, best shown in FIGS. 4 and 5, and described in more detail below. Vacuum is typically conveyed to the vacuum head through the support arm.

As best shown in FIGS. 2 and 3, a stepped axial hole 47 through the web 45 has a lower internally threaded portion 48 to receive an externally threaded stub 49 of a valve body 50, shown in section in FIG. 6. An O-ring 52 (not shown in FIGS. 3 and 6) in an annular groove 54 above the threaded portion 49 in the stub 49 engages a smooth bore portion of the stepped axial hole 47 to seal the valve body 50 in the hole 47. An annular ridge or bourlet 56 on the valve body 50 above the groove 54 limits the depth to which the valve body 50 can be screwed into the axial hole 47. The upper portion 60 of the valve body is in the form of a cylindrical tube, integral with the lower portion of the valve body 50 from the bourlet 56 on down. The upper portion 60 has a central bore 63 extending down to a step 65 at the level of the bourlet 56. A spring 70, shown schematically in FIG. 2 and more representationally in FIG. 3, is seated on the step 65 for biasing the valve to the closed position, as will be described in more detail below.

The exterior surface 72 of the upper portion 60 of the valve body 50 is a smooth cylindrical surface dimensioned to have an interference fit with the bore 75 of a conventional spherical bearing 80. The bearing 80 has an interior element 82 having an exterior convex spherical surface, and an exterior element 84 having a mating, or faying, interior concave spherical surface engaged with the convex spherical surface of the interior element 82. The mating (faying) spherical surfaces of the two elements 82 and 84 allow the exterior element to swivel universally on the interior element 82 about the center of curvature of the spherical interface between the elements 82 and 84, but prevent translation of the two parts apart from each other, so translation of the hard-stop 90 away from the base 30 is prevented by the mating (or faying) spherical surfaces of the spherical elements 82 and 84. The interior element 82 is pressed onto the cylindrical surface 72 of the valve body upper portion 60 until the interior element engages a step 86 formed at the junction of the upper portion 60 and the bonnet 56.

A hard-stop 90, shown in detail in FIGS. 7 and 8, has a stepped bore 92 and a flat top surface 94. The hard-stop 90 is pressed onto the exterior element 84 of the spherical bearing 80 so it is able to swivel universally about the center of curvature of the spherical interface of the spherical bearing 80. The hard-stop 90 is made of a tough, low friction, abrasion resistant material such a Delrin so it does not mar the surface of parts it engages when the vacuum head 25 pulls the part against the hard-stop 90. A series of shallow radial grooves 96 is cut in the top surface 94 for communication of vacuum from the valve body 50 to the vacuum cup, as described below.

A vacuum cup 100 is secured to the top of the base 30, in a groove 102 provided for that purpose, by a conventional clamp 104 such as a hose clamp or the like. The vacuum cup has a bellows skirt 106 which provides flexibility and an outward resilience to provide a firm resilient engagement with the surface of the part that is pushed against the vacuum head 25. The vacuum cup may be made of an elastomer that is resilient and provides a good seal with the surface of a part. A suitable material is Buna-N nitril rubber that is economical and widely available.

Vacuum is conveyed to the vacuum head 25 only when a part is in contact with the vacuum cup 100, so the vacuum in the system is not compromised by open vacuum heads. Vacuum is admitted to the volume within the vacuum cup 100 by pushing the part against the vacuum cup and against the head 108 of a nylon screw 110 that is threaded into a tapped hole 112 in the shank 115 of a valve plunger 120. The head 108 acts as a valve button by which the valve plunger 120 can be pushed to disengage an O-ring 123 in a groove 125 in conical lower portion 127 of the plunger 120 out of contact with a corresponding conical valve seat 128 at the lower end of the central bore 63 through the valve body 50, thereby establishing vacuum communication between the recess 40 and the interior of the vacuum cup 100. The valve plunger is biased to its closed position by the compression spring 70 bearing against the step 65 at its lower end, and, at it upper end, against a washer 130 held on the end of the valve plunger 120 by the screw 110. Thus, when the part is removed from the vacuum head 25, the spring 70 lifts the valve plunger 120 to engage the O-ring 123 with the valve seat 128 to close the valve.

In operation, the vacuum head 25 is mounted on the end of a support arm on which the part is to be supported and is secured thereon by the clamp structure 46. The clamp structure 46 includes a cut 131 perpendicular to the axis 35 about half way through the lower end of the base 30, and another radial cut 132 parallel to the axis 35 and intersecting the cut 132. These cuts 131 and 132 provide a pair of clamp arms that may be flexed inward. A screw 133 threaded into a tapped portion 134 of a hole 136 extending on a secant perpendicular to the cut 132 can be tightened to squeeze the clamp arms against the support arm in the recess 40 to hold the vacuum head 25 on the support arm.

Figure 9:
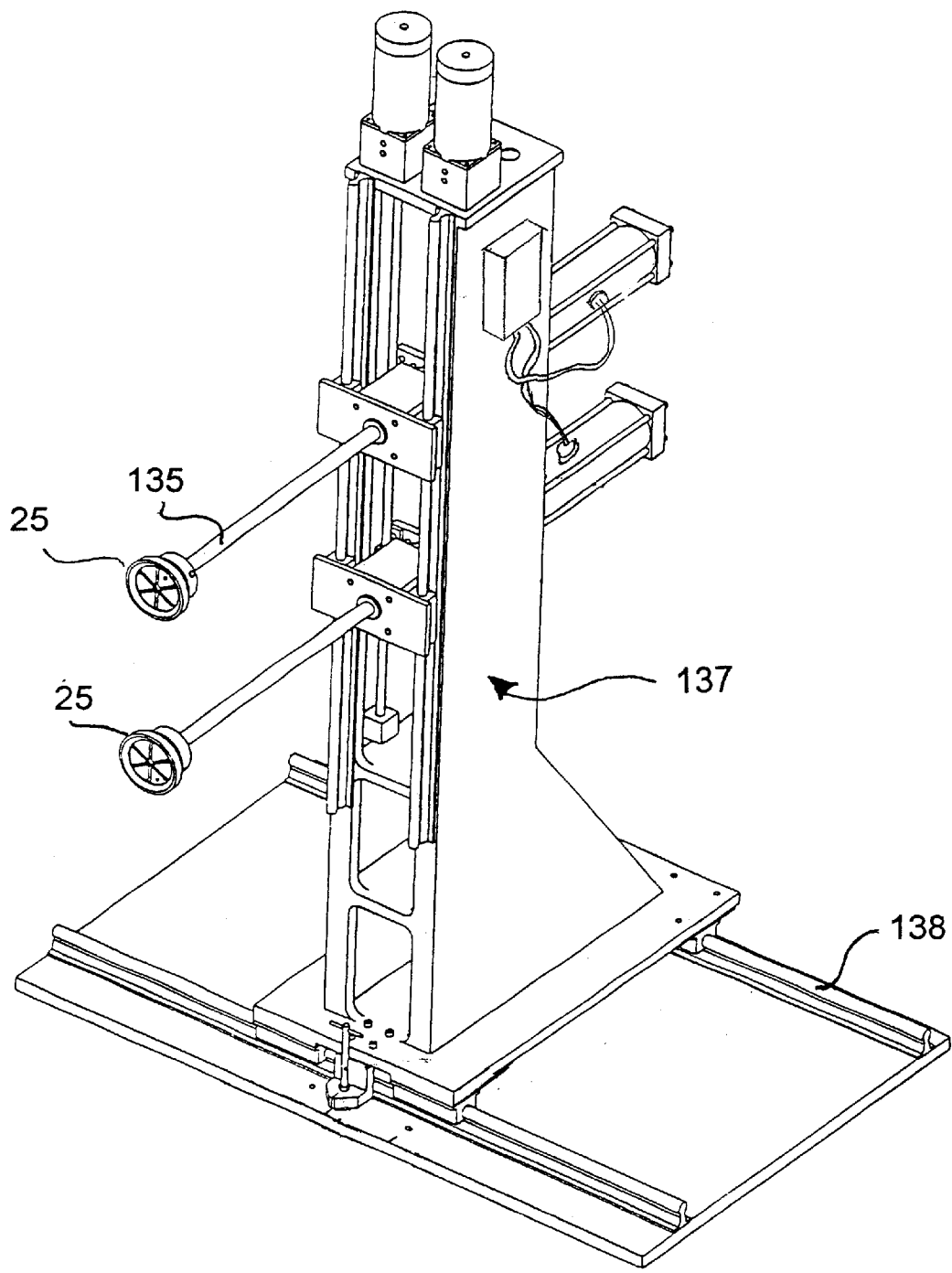
FIG. 9 is a perspective view of an exemplary holding apparatus on which the vacuum head of this invention could be used.

Typically, the part is supported on a holding apparatus having numerous support arms, each provided with a vacuum head 25. An example is shown in FIG. 9 wherein the support arms are pogos 135 which are adjustable lengthwise and also vertically on a series of stanchions 137 (only one of which is shown in FIG. 9), and the stanchions 137 are movable along rails 138. A holding apparatus of this type allows the vacuum head to be adjusted to any desired position in space within the range of the apparatus to position the vacuum heads exactly where desired so the part may be held for machining and/or assembly operations at a precisely known position and orientation. The universally swiveling hard-stop 90 on the vacuum head 25 allows the hard-stop to swivel to self-align to the plane of the part and lie flat against the part surface.

Figure 10:
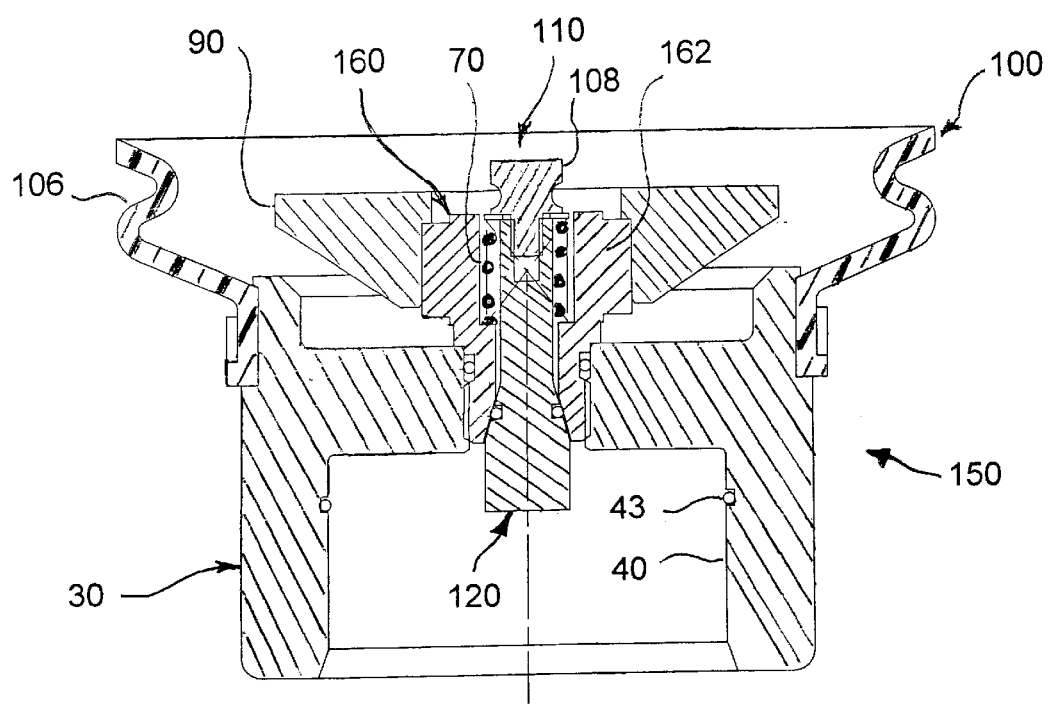
FIG. 10 is a sectional elevation of a second embodiment of a vacuum head in accordance with this invention having a fixed hard-stop.
Figure 11:
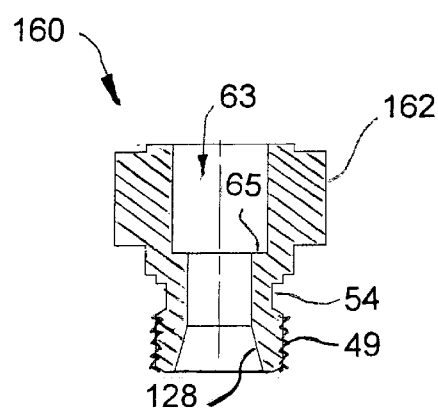
FIG. 11 is a sectional elevation of the valve body shown in FIG. 10 along lines 11—11 in FIG. 12.
Figure 12:
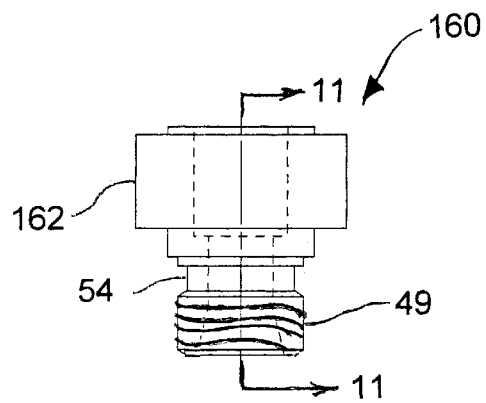
FIG. 12 is an elevation of the valve body shown in FIG. 10.

Turning now to FIG. 10, a vacuum head 150 is shown having a hard-stop 90 that is non-swiveling, that is, the hard-stop is fixed with respect to the base 30. The structure of the vacuum head 150 is identical to that of the vacuum head 25 shown in FIG. 2, except that the valve body 50 in the vacuum head 25 is replaced with a valve body 160 having a fixed mount for the hard-stop 90 instead of the universally swiveling spherical bearing mount used in the embodiment of FIG. 1. As shown in detail in FIGS. 11 and 12, the upper portion 162 of the valve body 160 is a cylinder having an outside diameter equal to the outside diameter of the spherical bearing, so the same hard-stop 90 can be mounted in a fixed position on the fixed upper portion of the valve body 160 instead of the universally swiveling spherical bearing 80. The biasing compression spring 70 is shown representationally in FIG. 10 instead of schematically as in FIG. 2.

Turning now to FIG. 13, a vacuum head 170 is shown having a hard-stop 175 mounted to swivel about a lateral axis lying perpendicular to the central axis 35. This third embodiment of the invention would normally be used when the part that it holds is too narrow to allow more than one vacuum head to engage the part at that location. In that case, the vacuum head 170 would be oriented with the swivel axis of the hard-stop 175 vertical so the part would be restrained from tilting away from the holding apparatus but the hard-stop would be free to swivel about the vertical axis to self-align with the surface of the part.

The vacuum head has a base that is identical to the base 30, with the addition of two vertical holes 181 drilled on a diameter across the web 182 and spaced equally from the central hole that receives the valve body 185. The holes 181 receive Allen head machine screws 186 which extend through the holes 181 and are threaded into tapped holes 187 in a truncated cylindrical bearing block 190 to hold the bearing block in place on the floor of the upper recess 38. The bearing block has a flat surface 194 at about the ⅔ the diameter of the cylinder which is held flat against the floor of the recess 38 by the screws 186.

The hard-stop 175 has a cylindrical recess 197 open at one axial end (the left end in FIG. 13) and closed by a flat end 191 at the other end (the right end in FIG. 10). The cylindrical recess 197 receives the bearing block 190 with a snug fit. The cylindrical interface between the bearing block and the hard-stop recess 197 allows the hard-stop to swivel about 10°–20° on the bearing block 190 about the axis 198 of the cylinder and be retained on the bearing block by the portions of the hard-stop 175 which extend around the bearing block below the horizontal plane through the axis 198. A pin 199 through a hole 193 in the hard-stop 175 spans the cylindrical recess 197 adjacent the end of the bearing block 190 to prevent lateral translation of the hard-stop 175 along the bearing block 190. Lateral translation of the hard-stop 175 is prevented by engagement of the other end of the bearing block 190 with the end 191 of the cylindrical recess 197.

The bearing block is sealed to the floor of the recess 38 by O-rings 200 lying in shallow counterbores around the holes 181. The O-rings 200 prevent leakage of vacuum under the bearing block 190 and through the holes 181.

The valve body 185 does not support the hard-stop 175, so it does not need and does not have an upper portion. It is screwed into the central hole in the web 182 by a spanner (not shown) having pins the fit into diametrically opposite holes in the top surface of the valve body. In all other respects, the struc4ture and function of the valve body and valve plunger are the same as the corresponding parts in the embodiments of FIGS. 1 and 10.

Obviously, numerous modifications and variations of the system disclosed herein will occur to those skilled in the art in view of this disclosure. Therefore, it is expressly to be understood that these modifications and variations, and the equivalents thereof, will be considered to be within the spirit and scope of the invention as defined in the following claims, wherein we claim:

What is claimed is:

1. A method of holding a part on a fixture in a precisely known predetermined position, comprising:

pressing a surface of said part against a hard-stop, mounted on a spherical bearing in a base of a vacuum head for universal swiveling about a center of curvature of said spherical bearing at a known position in said base;

allowing said hard-stop to swivel universally about said center of curvature and for said hard-stop in said base to self-align with said surface on said part;

sealing an annular elastomeric sealing ring mounted on aid base around said hard-stop against said part surface to create a suction chamber between said part and said base within said sealing ring;

engaging a valve button of a valve with said part surface to move said valve and establish communication between a source of partial vacuum and said suction chamber;

pulling said part with said partial vacuum against said hard stop in said vacuum head, and holding said part with said partial vacuum at a known position against said hard-stop.

2. A method as defined in claim 1, further comprising:

engaging said valve button with said part at a central position in said hard-stop by virtue of said valve being mounted in an axial bore through said hard-stop.

3. A method as defined in claim 1, further comprising:

admitting said partial vacuum into said suction chamber by moving said valve off a valve seat by said engaging said valve button of said valve with said part surface, and opening a clear space for free flow of air out of said suction chamber through said axial bore.

4. A method as defined in claim 1, further comprising:

retaining said hard-stop on said base against vertical translation by engaging faying surfaces of an exterior element of said spherical bearing having a mating interior concave spherical surface engaged with a convex spherical surface of an interior element of said spherical bearing to prevent said hard-stop 90 from falling off said base when said base is tilted.

* * * * *